US012723562B2

(12) United States Patent
Bitler et al.

(10) Patent No.: US 12,723,562 B2
(45) Date of Patent: Sep. 1, 2026

(54) AIR DELIVERY DEVICE FOR INTERNAL COMBUSTION ENGINES

(71) Applicants: Jonathan Bitler, Weeki Wachee, FL (US); Ryan Harper, Satellite Beach, FL (US)

(72) Inventors: Jonathan Bitler, Weeki Wachee, FL (US); Ryan Harper, Satellite Beach, FL (US)

( * ) Notice: Subject to any disclaimer, the term of this patent is extended or adjusted under 35 U.S.C. 154(b) by 248 days.

(21) Appl. No.: 18/465,354

(22) Filed: Sep. 12, 2023

(65) Prior Publication Data

US 2025/0084812 A1 Mar. 13, 2025

Related U.S. Application Data

(60) Provisional application No. 63/375,520, filed on Sep. 13, 2022.

(51) Int. Cl.
*F02M 35/10* (2006.01)

(52) U.S. Cl.
CPC ............................ *F02M 35/10157* (2013.01); *F02M 35/10196* (2013.01); *F02M 35/10262* (2013.01); *F02M 35/10327* (2013.01); *F02M 35/10367* (2013.01); *F02M 35/10091* (2013.01); *F02M 35/10209* (2013.01); *F02M 35/10229* (2013.01); *F02M 35/10236* (2013.01); *F02M 35/10242* (2013.01); *F02M 35/10373* (2013.01); *F02M 35/1038* (2013.01); *F02M 2700/05* (2013.01)

(58) Field of Classification Search
CPC ....... F02M 35/10157; F02M 35/10196; F02M 35/10327; F02M 35/10367; F02M 35/10091; F02M 35/02–168; F02M 35/10209; F02M 35/10229; F02M 35/10236; F02M 35/10242; F02M 35/10373; F02M 35/1038; F02M 2700/05; Y02T 10/12
See application file for complete search history.

(56) References Cited

U.S. PATENT DOCUMENTS

| | | | | |
|---|---|---|---|---|
| 3,224,174 | A | 12/1965 | Erbstoesser | |
| 3,347,028 | A | 10/1967 | Erbstoesser | |
| 3,484,817 | A * | 12/1969 | Wood | F16K 17/1606 220/89.2 |
| 3,834,581 | A * | 9/1974 | Solter | F16K 17/1613 137/68.28 |
| 5,083,547 | A * | 1/1992 | Davis | F02M 35/042 123/527 |
| 6,886,526 | B2 | 5/2005 | Bishop | |
| 7,107,962 | B1 * | 9/2006 | Spies | F02M 35/10196 261/50.1 |

(Continued)

*Primary Examiner* — Tinh T Dang
(74) *Attorney, Agent, or Firm* — DP IP GROUP; Franco S. De Liguori

(57) ABSTRACT

An air delivery device for supplying air to an internal combustion engine. The air delivery device has a body constructed from two pieces removably joined together as a sealed unit to prevent leakage of air from an interior of the body. The body has an inlet through which air enters the interior and an outlet through which air exits from the body for supplying the air to an internal combustion engine. A dual seal inlet coupler is removably connected to the body at the inlet and configured to receive incoming air and direct the air through the inlet and into the interior of the body.

15 Claims, 3 Drawing Sheets

(56) References Cited

U.S. PATENT DOCUMENTS

| | | | | |
|---|---|---|---|---|
| D582,433 | S | 12/2008 | Rosenbaum | |
| 2012/0294703 | A1* | 11/2012 | Lei | F04D 29/624<br>415/204 |

* cited by examiner

AIR DELIVERY DEVICE FOR INTERNAL COMBUSTION ENGINES

CROSS-REFERENCE TO RELATED APPLICATIONS

This application claims the benefit of U.S. Provisional Application No. 63/375,520, filed Sep. 13, 2022.

BACKGROUND OF THE INVENTION

Field

The invention relates to a multipurpose air delivery device for prioritizing more air into an internal combustion engine, thereby creating more horsepower by delivering more air (compressed air to speed up engine revolutions per minute or RPM) from a supercharger, turbocharger or fresh air from a naturally aspirated or nitrous oxide assisted internal combustion engine.

Background Information

Prioritizing more air is paramount due to the increased level of oxygen needed to mix with the fuel, which provides a proper air fuel ratio for an internal combustion engine. The air intake device forces air and will direct the air to the carburetor where it is needed while boost referencing the fuel pressure regulator to increase fuel demand for a complete and clean fuel burn. This increased air flow allows more fuel to be added which makes more horsepower at extreme engine loads while balancing the internal combustion engine. It is advantageous to measure air intake temperatures, air speed, vacuum/manifold atmospheric pressure and fuel pressure referencing in order to properly tune the internal combustion engine for more horsepower. Due to the high levels of pressures in these systems sometimes engine failures can take place when these units of measure are inaccurate. An atmospheric reverse pressure disc would be beneficial to protect any reversion and discharge of the engine.

REFERENCES CITED

The following patent references cited below are for informational purposes and to facilitate consideration of potentially relevant prior art U.S. Pat. No. 3,224,174 A December 1965 Erbstoesser
U.S. Pat. No. 3,347,028 A October 1967 Erbstoesser
U.S. Pat. No. 3,484,817 A December 1969 Wood
U.S. Pat. No. 6,886,526 B2 May 2005 Bishop
U.S. Pat. No. 7,107,962 B1 September 2006 Spies et al.
D582,433 S December 2008 Rosenbaum

SUMMARY OF THE INVENTION

The Multipurpose air delivery device utilizes a 10-degree shift forward at the base where it is configured to be mounted and sealed on both ends with an O-ring to the top of the carburetor and a dual seal at the appended inlet from the compressor to help equal distribution of air flow under compressed air or draw through naturally aspirated/nitrous assisted internal combustion engines. The advantages of this design allow for better left to right air distribution of air flow directed in the internal combustion engine with no air leaks along with the four ports for monitoring air speed, intake air temperature, vacuum/manifold atmospheric pressures and also the extra port for force induction setups to vacuum/boost a fuel pressure regulator to meet fuel demands when atmospheric conditions raise 1:1 ratio. Additionally, there is an opening that requires a safety pressure relief or burst disc on the side of the unit to protect an internal combustion engine that is turbocharged, supercharged or nitrous equipped from further damage if it were to have a significant pressure reversion.

BRIEF DESCRIPTION OF DRAWINGS

The invention will now be illustrated with respect to the following drawings illustrating embodiments of the invention in which.

DETAILED DESCRIPTION OF THE INVENTION

Figure 1:
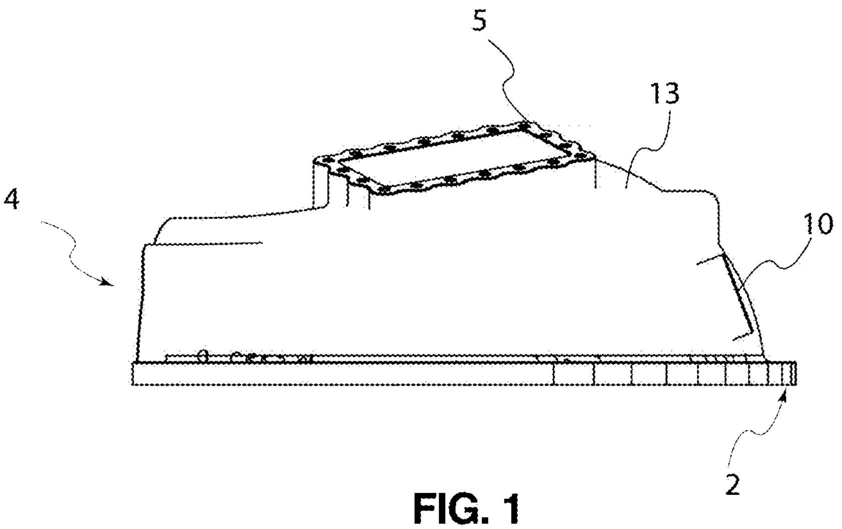
FIG. 1 is a perspective of one half of the multipurpose air delivery device that houses the atmospheric pressure relief or burst disc and two of the four monitoring ports.
Figure 2:
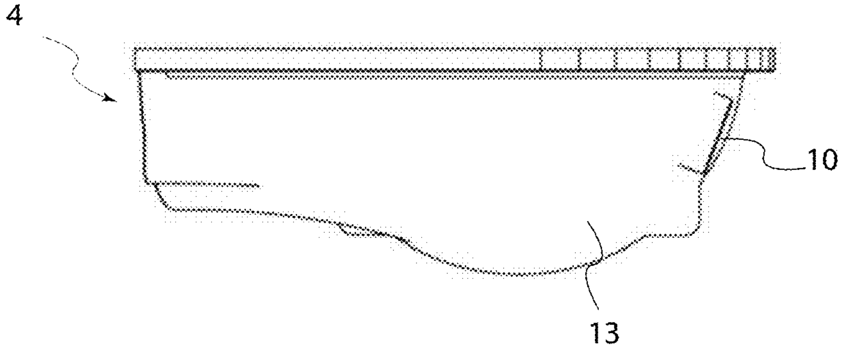
FIG. 2 is the other half of the multipurpose air delivery device which houses the remaining two air monitoring ports.
Figure 6:
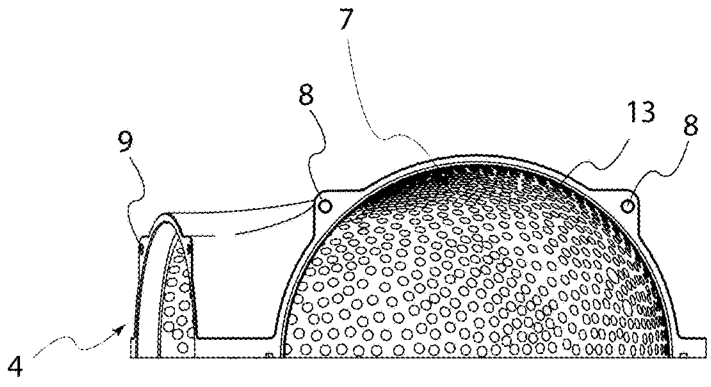
FIG. 6 is an underside perspective view of FIG. 2 that shows the locations where the device is secured to a carburetor.
Figure 7:
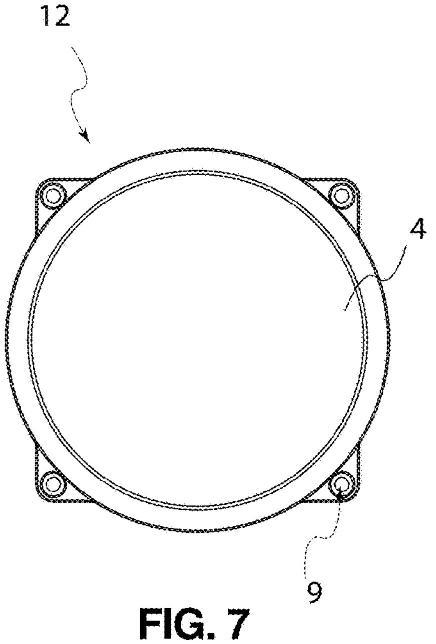
FIG. 7 is a front view of the dual sealed coupler that affixes to the inlet of the multipurpose air delivery device in FIG. 1 and FIG. 2 when they are joined together.

Referring to FIGS. 1 and 2, illustrated are two halves of the multipurpose air delivery device, referred to as the body (13) which is constructed of 6061 billet aluminum with an option to have a hard anodized finish to strengthen the material. The two pieces of the body (13) are joined together by stainless steel or titanium hardware screws (2) and two O-rings (14) (15) that join the two halves together to seal the unit from potential air leaks when under pressure. The device has a dual seal inlet coupler (12), shown in FIG. 7, that is attached to an inlet (4) by four titanium or stainless screws (9), and the inlet (4) with the coupler (12) is then attached to a supercharger, turbocharger or air duct tube and an outlet (3) that fastens to the top of a carburetor by 4 titanium or stainless hardware (8), as shown in FIG. 6. As shown in FIGS. 1-4, the body (13) houses monitoring ports (10). FIG. 1 shows a housing area (5) of the device for a reverse pressure disc assembly or pressure relief burst plate.

Compressed air coming from a supercharger, turbocharger or air duct enters the inlet (4) with the coupler (12) and is forced or drawn through the multipurpose air delivery device and enters the carburetor. It is necessary for an internal combustion engine to have air that is prioritized to the carburetor to meet the fuel demands in high horsepower situations. This ensures the mixture of fuel and air burns clean during extreme loads.

There are four monitoring ports (10) located in the center of the back of the body (13) of the multipurpose air delivery device. These ports (10) can be plugged if the consumer chooses not to use them in a naturally aspirated setting, or sensors can be added to measure air cubic feet per meter, air temperature, manifold atmospheric pressure and air speed. One port of the four ports (10) is intended to be used as a boost reference for a fuel pressure regulator to make the fuel mixture and air mixture raise to a 1:1 ratio.

Figure 3:
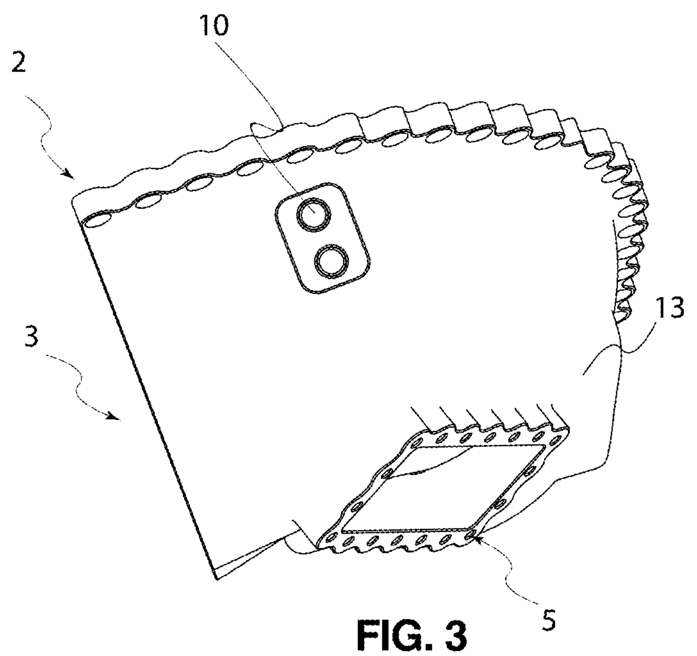
FIG. 3 is a rear-view in perspective of FIG. 1 that shows the monitoring ports and atmospheric pressure relief or burst disc.
Figure 4:
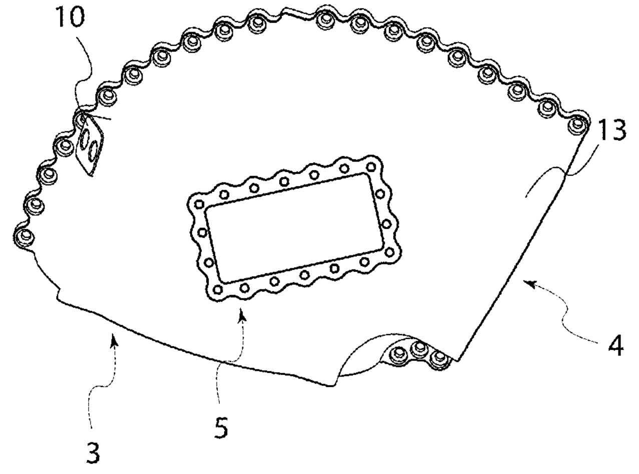
FIG. 4 is a side view in perspective of FIG. 1.

FIGS. 1, 3 and 4 shows the housing area (5) for a pressure relief burst plate that is attached by 18 titanium or stainless-steel screws. The relief burst plate or pressure disc assembly is necessary to be added to the housing area (5). It is a unique safety feature addition to the invention that is intended to keep the charge pipe or air duct from blowing off the internal combustion engine by allowing the pressure to be relieved or forced out through the pressure disc assembly. There is a potential for a reverse pressure situation when the ignition system malfunctions, or other operator errors exist that cause the engine to backfire causing pressure to come back into the intake manifold and up through the carburetor and out through the multipurpose air delivery system.

Figure 5:
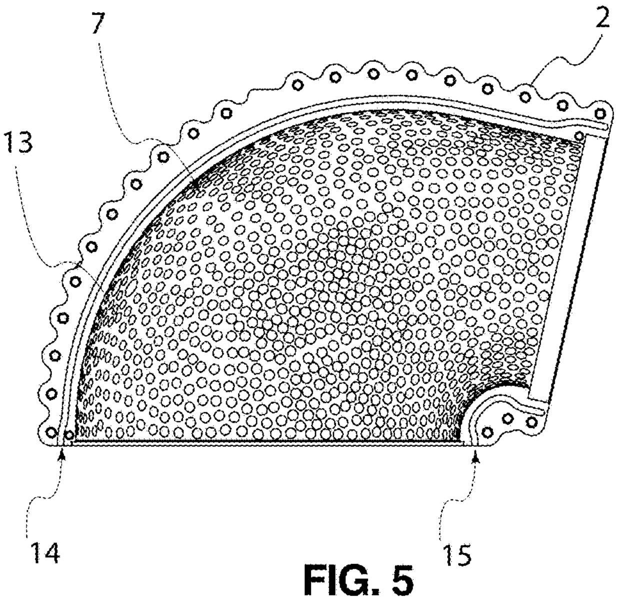
FIG. 5 is the inside view of FIG. 2 that shows the optional dimple porting machining.

FIGS. 5 and 6 illustrates the optional dimple porting (7) on the inside surface of the body (13) that allows the compressed or drawn air to be centered in the port as it goes into the top of the carburetor. It is intended to correct the turbulence of the air flow and direct it straight into the carburetor through the outlet (3).

The invention claimed is:

1. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine; and an inlet coupler removably connected to the body at the inlet and configured to receive incoming air and direct the air through the inlet and into the interior of the body;

wherein the two pieces of the body are sealed together by O-rings to prevent air leakage from the interior of the body under pressure.

2. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine; and an inlet coupler removably connected to the body at the inlet and configured to receive incoming air and direct the air through the inlet and into the interior of the body;

wherein one of the two pieces of the body has a housing portion configured for connection to a reverse pressure disc assembly for releasing pressure from the interior of the body in response to a reverse pressure condition.

3. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine; and an inlet coupler removably connected to the body at the inlet and configured to receive incoming air and direct the air through the inlet and into the interior of the body;

wherein each piece of the body is provided with two monitoring ports.

4. The air delivery device of claim 3, wherein at least one of the monitoring ports monitors at least one of air volumetric flow rate, air temperature, manifold atmospheric pressure, and air velocity.

5. The air delivery device of claim 1, wherein the body is formed from a 6061 aluminum alloy.

6. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine;

an inlet coupler removably connected to the body at the inlet and configured to receive incoming air and direct the air through the inlet and into the interior of the body; and internal dimple porting formed on an interior surface of the body.

7. The air delivery device of claim 6, wherein the internal dimple porting is configured to center airflow through the body and reduce turbulence prior to entering the outlet.

8. The air delivery device of claim 1, wherein the outlet of the body is configured for being mounted directly to an air inlet of the internal combustion engine carburetor.

9. The air delivery device of claim 8, further comprising: monitoring ports formed on the body for monitoring operating conditions of the internal combustion engine; and internal dimple porting formed on an interior surface of the body and configured to center airflow through the body and reduce turbulence prior to entering the outlet; wherein the body, inlet, outlet, inlet coupler, monitoring ports, and internal dimple porting are configured to cooperate to prioritize airflow into the carburetor for increased performance of the internal combustion engine.

10. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine;

an inlet coupler removably connected to the body at the inlet and configured to receive incoming air and direct the air through the inlet and into the interior of the body; and wherein the two pieces of the body are joined together by stainless steel or titanium hardware screws and two O-rings that join the two pieces together to seal the unit from potential air leaks when under pressure.

11. An air delivery device for supplying air to an internal combustion engine, the air delivery device comprising:

a body constructed from two pieces removably joined together as a sealed unit to prevent leakage of air from an interior of the body, the body having an inlet through which air enters the interior and an outlet through which air exits from the body for supplying the air to the internal combustion engine;

an inlet coupler removably connected to the body at the inlet and configured to receive incoming air and direct the air through the inlet and into the interior of the body;

monitoring ports formed on the body for monitoring operating conditions of an internal combustion engine; and internal dimple porting formed on an interior surface of the body and configured to center airflow through the body and reduce turbulence prior to entering the outlet.

12. The air delivery device of claim 11, wherein the two pieces of the body are joined together by stainless steel or titanium hardware screws and two O-rings that join the two pieces together to seal the unit from potential air leaks when under pressure.

13. An air delivery device for supplying air to an internal combustion engine, the air delivery device comprising:

a body constructed from two pieces of aluminum removably joined together as a sealed unit to prevent leakage of air from an interior of the body, the body having an inlet through which air enters the interior and an outlet through which air exits from the body for supplying the air to the internal combustion engine;

an inlet coupler removably connected to the body at the inlet and configured to receive incoming air and direct the air through the inlet and into the interior of the body; and monitoring ports formed on the body for monitoring operating conditions of the internal combustion engine.

14. The air delivery device of claim 13, wherein the two pieces of the body are joined together by stainless steel or titanium hardware screws and two O-rings that join the two pieces together to seal the unit from potential air leaks when under pressure.

15. The air delivery device of claim 14, further comprising internal dimple porting formed on an interior surface of the body and configured to center airflow through the body and reduce turbulence prior to entering the outlet; and wherein one of the two pieces of the body has a housing portion configured for connection to a reverse pressure disc assembly for releasing pressure from the interior of the body in response to a reverse pressure condition.

* * * * *